UNITED STATES PATENT OFFICE 2,370,006

UNSATURATED CYANOALDEHYDES AND METHOD FOR THEIR PREPARATION

Herman A. Bruson and Thomas W. Riener, Philadelphia, Pa., assignors to The Resinous Products & Chemical Company, Philadelphia, Pa., a corporation of Delaware No Drawing. Application May 25, 1943,
Serial No. 488,400

5 Claims. (Cl. 260—464)

This invention relates to unsaturated cyanoaldehydes and to a method for their preparation. More particularly it deals with new compounds having the formula:

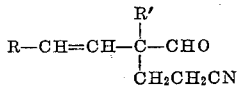

wherein R and R' are hydrocarbon radicals, and with a process by which such compounds can be prepared.

According to this invention, unsaturated cyanoaldehydes of the above formula are obtained by condensing acrylonitrile in the presence of an alkaline condensing agent as catalyst with an $\alpha,\gamma$-disubstituted crotonaldehyde having the formula:

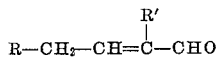

The reaction which occurs involves a molecular rearrangement and is summarized by the following equation:

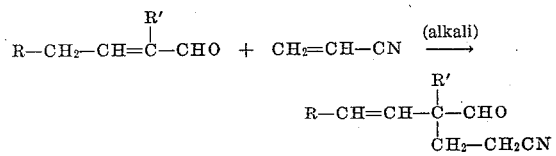

Typical alkaline condensing agents which can be used include the oxides, hydroxides, amides, hydrides, and alcoholates of the alkali metals, the alkali metals themselves, or strong non-metallic bases such as, for example, quaternary ammonium hydroxides. Of these agents, potassium hydroxide, trimethyl benzyl ammonium hydroxide, and sodium hydroxide have been found to be very efficient for the purpose.

The quantity of alkaline condensing agent used is small, amounts of the order of 0.5% to 5% on the combined weight of the reactants being sufficient to catalyze the reaction. If the aldehydes employed, however, are old and, therefore, partially oxidized, it is necessary to add sufficient alkali to neutralize such acidity and then a small excess to maintain constant alkalinity throughout the course of the condensation. Consequently, the reaction mixture is advantageously tested from time to time to make certain it is always alkaline to litmus indicator.

The condensation can be carried out in the absence or in the presence of an inert solvent such as benzene, dioxane, or tertiary butyl alcohol; and water can be used as a solvent for the alkali. The reaction is exothermic and is preferably controlled by cooling or by the rate of addition of one reactant to the others. Reaction occurs at temperatures as low as 0° C. in many cases and is greatly accelerated at temperatures from 45° C. to 80° C.

Typical $\alpha,\gamma$-disubstituted crotonaldehydes of the formula:

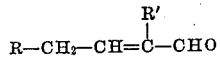

which can be used for the purpose of this invention are those in which R' is an alkyl group, such as methyl, ethyl, propyl, butyl, hexyl, etc., and R is a hydrocarbon group selected from alkyl, aryl, aralkyl, or cycloalkyl groups, such as methyl, ethyl, propyl, butyl, phenyl, methyl phenyl, butyl phenyl, benzyl, cyclohexyl, methyl cyclohexyl, etc. The more important and more readily available of these $\alpha,\beta$-unsaturated aldehydes are those wherein R and R' are alkyl groups which may be the same or different. These are readily obtainable by condensing together two molecules of the same aldehyde or a molecule of each of two different aliphatic aldehydes by known methods involving aldolization and the elimination of water. Among these are $\alpha,\gamma$-diethyl crotonaldehyde, which is obtained from n-butyraldehyde by reaction with alkalies or acids, $\alpha,\gamma$-dimethyl crotonaldehyde, $\alpha,\gamma$-dibutyl crotonaldehyde, $\alpha$-methyl-$\gamma$-ethyl crotonaldehyde, and their homologues.

The following examples illustrate this invention, the parts given being by weight:

Example 1

Acrylonitrile (53 parts) was added dropwise during the course of twenty minutes to a stirred mixture consisting of 126 parts of $\alpha,\gamma$-diethyl crotonaldehyde, 126 parts of tertiary butyl alcohol, and 5 parts of methanolic 30% potassium hydroxide solution while the reaction temperature was maintained at 26°–32° C. The mixture was stirred thereafter for two hours at room temperature and was then acidified with dilute hydrochloric acid, washed, dried, and distilled in vacuo. The main fraction (79 parts) distilled at 140°–145° C./6 mm. Upon redistillation it boiled at 138°–141° C./6 mm. and formed a pale yellow oil, corresponding to the formula:

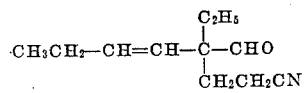

*Example 2*

Acrylonitrile (110 parts) was added dropwise during the course of ninety minutes to a rapidly stirred mixture consisting of 252 parts of α,γ-diethyl crotonaldehyde and 10 parts of aqueous 50% potassium hydroxide solution while the reaction mixture was maintained at 45°–55° C. After all of the acrylonitrile had been added, the mixture was stirred for one hour longer at 45°–55° C. It was then cooled and neutralized with dilute hydrochloric acid. The product was washed with water, dried, and distilled in vacuo.

The 2-ethyl-2-(β-cyanoethyl)-3-hexenal-1 distilled over between 126° and 135° C. at 4 mm. as a pale yellow oil in a yield of 175 parts.

The products are of value as intermediates for the preparation of pharmaceuticals, insecticides, and resins.

This invention is a continuation-in-part of co-pending application Serial No. 466,050, filed November 18, 1942.

We claim:

1. A process for preparing unsaturated cyano-aldehydes which comprises reacting acrylonitrile in the presence of an alkaline condensing agent with an α,γ-disubstituted crotonaldehyde in which the α- and γ-substituents are hydrocarbon groups.

2. A process for preparing unsaturated cyano-aldehydes which comprises reacting acrylonitrile in the presence of an alkaline condensing agent with an α,γ-dialkyl crotonaldehyde.

3. A process for preparing unsaturated cyano-aldehydes which comprises reacting acrylonitrile in the presence of potassium hydroxide with an α,γ-dialkyl crotonaldehyde.

4. A process for preparing 2-ethyl-2-(β-cyanoethyl)-3-hexenal-1 which comprises reacting acrylonitrile in the presence of potassium hydroxide with α,γ-diethyl crotonaldehyde.

5. As a new compound, 2-ethyl-2-(β-cyanoethyl)-3-hexenal-1.

HERMAN A. BRUSON.
THOMAS W. RIENER.